Nov. 28, 1939.
H. G. IRWIN
2,181,658
WIND POWER MACHINE
Filed July 14, 1938
3 Sheets-Sheet 1
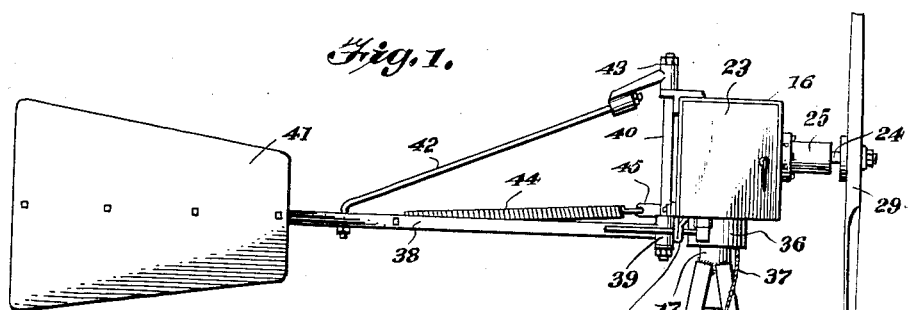
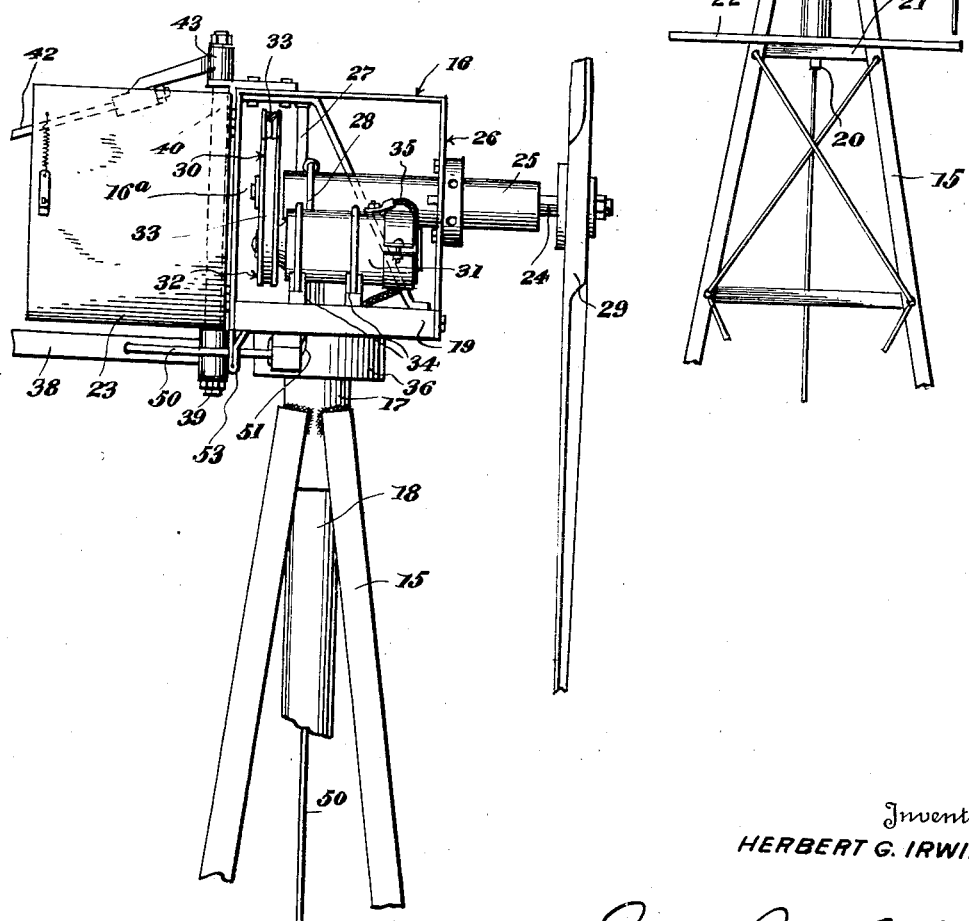
Inventor
HERBERT G. IRWIN
By *Irving R. M Cathran*
Attorney Nov. 28, 1939.                H. G. IRWIN                 2,181,658
                          WIND POWER MACHINE
                          Filed July 14, 1938           3 Sheets-Sheet 2
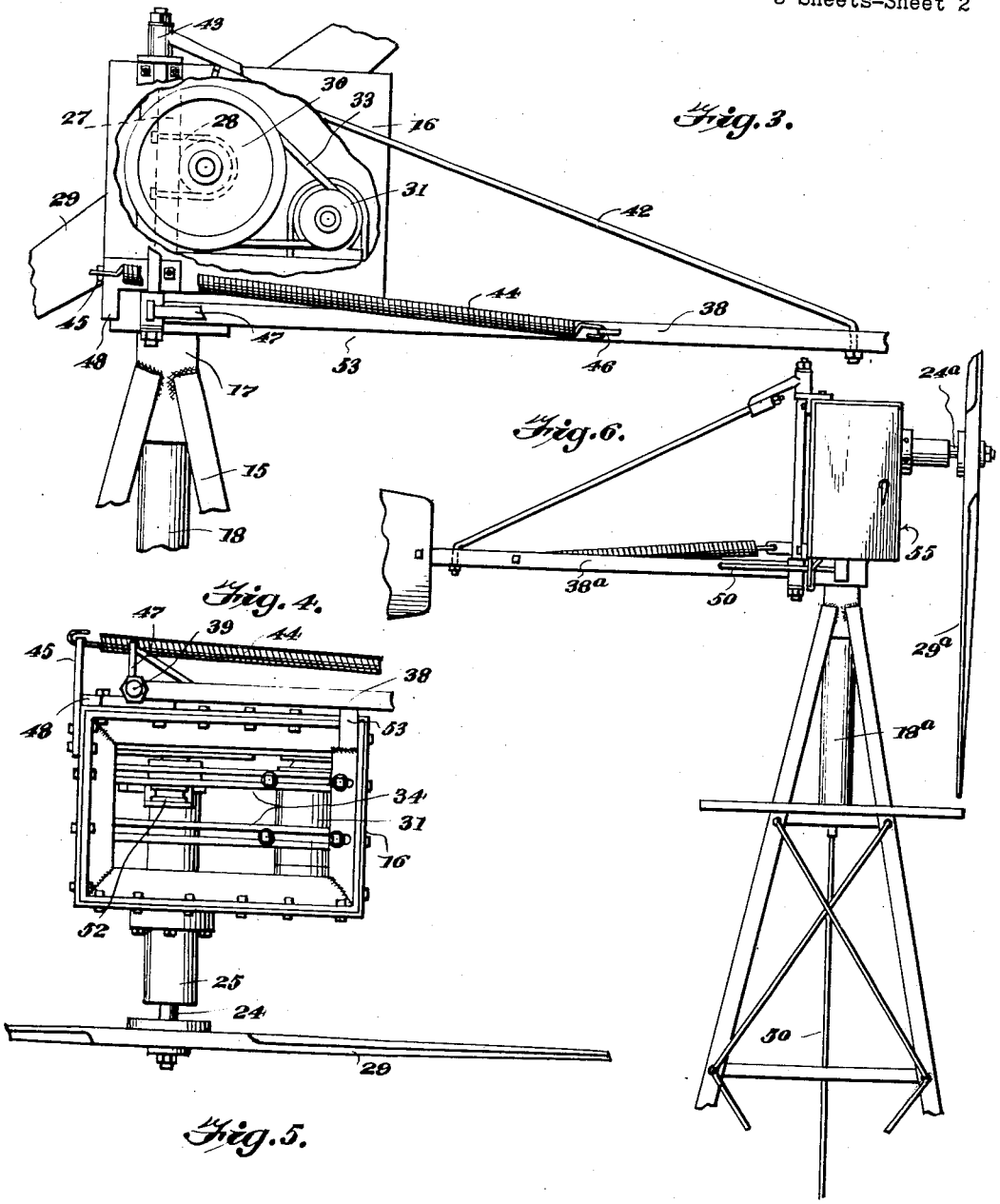
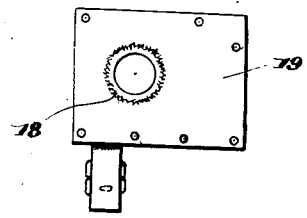
Inventor
HERBERT G IRWIN
By *Irving R. McCathran*
                    Attorney

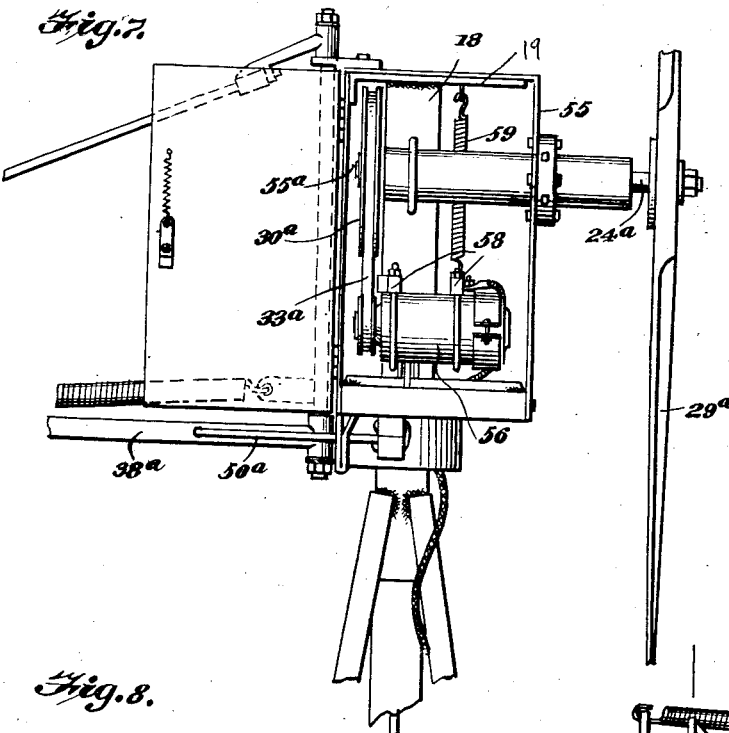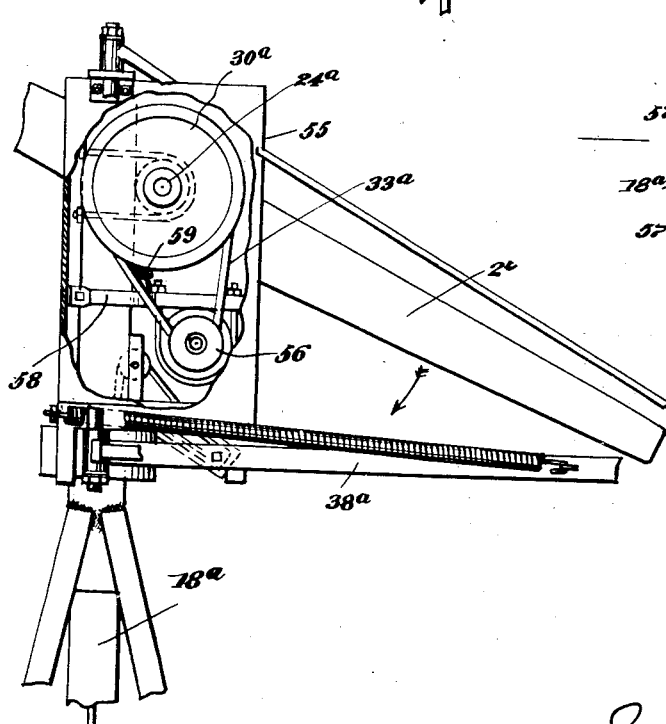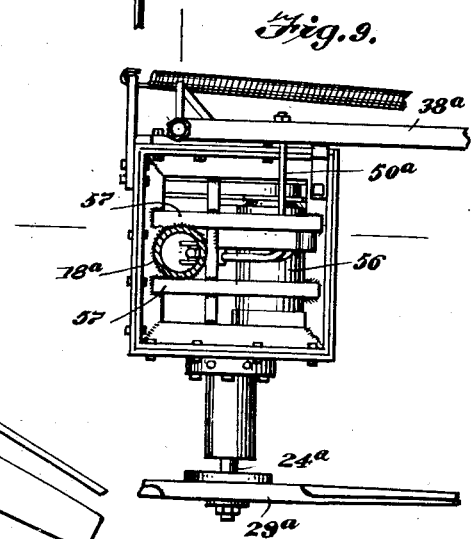

Patented Nov. 28, 1939

2,181,658

UNITED STATES PATENT OFFICE 2,181,658

WIND POWER MACHINE

Herbert G. Irwin, Amarillo, Tex.

Application July 14, 1938, Serial No. 219,275

2 Claims. (Cl. 290—55)

My invention relates to a wind power machine of the type used in supplying motive power for driving an electric generator, and the primary object of my invention is to provide a wind driven machine of simple construction for driving a small electric generator which generator in turn charges an electric storage battery.

A further object of my invention is to provide a wind power machine for use in the windy sections of the country, which machine is designed to drive an electric generator of the automotive type in a highly efficient manner.

A further object of my invention is to provide in a machine of the character stated, an automatic control for limiting the speed of the generator drive in storm winds.

A further object of my invention is to provide in a machine of the character stated, a substantial housing for protecting the electric generator and drive belt from rain and ice, and utilizing further the wall of the housing for supporting an exterior wind rotor blade.

A still further object of my invention is to provide in a machine of the character stated, a comparatively large opening with a hinged closure in the wall of the generator drive housing through which opening the drive belt or generator may be removed and replaced.

Another object of my invention is to provide in a machine of the character stated, construction and arrangement of the belt drive mechanism in a wind rotor blade supporting house, whereby the generator or drive belt may be removed for repairs or replacement without disturbing the mechanism for driving the belt.

Still another object of my invention is to provide, in a machine of the character stated, a passageway around the end of the belt drive wheel shaft and one side of the belt drive wheel through which a replacement belt may be passed onto the belt drive wheel.

Other objects and advantages of the present invention will appear throughout the following specification and claims.

In the drawings:

Figure 1 is a side view of a wind power plant constructed in accordance with my invention;

Figure 2 is an enlarged side view of the power house with the door open to show the electric generator and the belt drive mechanism;

Figure 3 is a view looking at the back of the power house, a large portion of the back wall being cut away showing the belt wheels and drive belt;

Figure 4 is a view of the bottom of the power house with the tower turn-pipe removed;

Figure 5 is a top plan view of the power house supporting plate which is carried by the upper end of the tower turn-pipe;

Figure 6 is a side view of a modified form of my invention;

Figure 7 is an enlarged side view of the power house with the side door open showing modification in carrying out my invention;

Figure 8 is a view looking at the back of the house shown in Figure 7, a large portion of the back wall being cut away showing modification in construction and arrangement;

Figure 9 is a bottom view of the power house of Figures 8, 7 and 6.

By referring to Figures 1, 2, 3, 4 and 5 of the drawings, it will be seen that 15 designates a tower upon which the power house 16 is mounted for rotating movement so that the power house 16 will be automatically shifted to face any direction of the wind. The tower 15 carries a sleeve 17 at its upper end, within which sleeve is rotatably mounted the turn-pipe or neck 18. A base plate 19 is carried by the upper end of the turn-pipe 18 and constitutes an integral part therewith by being welded or otherwise secured thereto, as indicated in Figure 5. The lower end of the power house 16 is supported upon the base plate 19 and the lower end of the turn-pipe 18 is provided with a reduced extension 20 which extends through a suitable bearing support 21, mounted within the tower 15. A work platform 22 is also supported by the support 21 below the power house 16 for supporting a workman in a convenient position for inspecting the working parts of the exterior or interior of the house 16. The power house 16 is provided with a vertically disposed hinged door 23, as shown in Figure 2.

A rotor blade-supporting shaft 24 is journaled in the tubular bearing retainer and support 25, which support extends through the front wall 26 of the power house 16 and is supported in a projecting position, as shown in the drawings. The rear end of the tubular bearing support 25 is secured to the upright bar 27 by means of a U-bolt 28, as illustrated in Figure 3, the U-bolt 28 being tightened by means of suitable nuts in the conventional manner. Suitable anti-friction bearings are disposed within the tubular bearing support 25, at each end thereof, upon which bearings the shaft 24 rotates. A wind rotor blade 29 is carried by the outer end of the shaft 24, and a belt drive wheel 30 is carried by the inner end of the shaft 24. An electric generator 31 is mounted adjacent the shaft 24 within the power house 16, and the generator 31 carries a pulley 32 which is connected with the pulley 30 by means of a V-belt 33. The generator 31 is mounted adjustably on the supporting rails 34 carried by the base of the power house 16, so that the drive belt 33 may be tightened when needed.

A conventional flexible current take-off 35, which is connected at one end to the generator 31, is connected at its opposite end to a conventional swivel brush rigging carried in the housing 36 supported at the upper end of the sleeve 17. A current take-off wire 37 leads from the swivel brush rigging in the housing 36 down the tower 15 and off to a suitable support to an automatic circuit cut-out and storage battery or other source of electrical distribution. These particular features may be varied as occasion demands, and when an automatic electric generator of the type having the automatic circuit cut-out mounted on the generator is used, the flexible cable 35 is connected with the take-off terminal of the circuit cut-out.

A vane arm 38 is pivotally secured, as at 39, to a bracket rod 40 supported upon the rear side of the house 16. This vane arm 38 normally extends in substantially parallel alignment with the longitudinal axis of the rotor blade shaft 24 and rearwardly of the power house 16. The arm 38 supports a vertically extending wind vane 41 at its rear end. A truss rod 42 is attached to the arm 38 near its rear end or its midway portion and is pivotally secured to the upper end of the bracket rod 40, as at 43. A coil spring 44 is connected at one end to the bar projection 45 carried at the base of the house 16, and at its opposite end to the vane arm 38, at 46. The arm 38 is provided at its forward or pivot end with a lateral projection 47, the outer end portion of which projection abuts a stop 48 extending downwardly of the house 16 to limit the swing of the arm 38 against the pull of the spring 44 in its normal relative position with the vane arm 38, as shown in Figures 1, 2, 6 and 7. This spring 44 normally holds the vane arm projection 47 and the stop 48 in contact and in this way the wind rotor blade 29 is constantly directed face toward normal winds by the vane 41, which vane 41 turns the house 16 on the tower 15 when a change in the direction of the wind occurs. The various changes in the direction of the wind as the days pass, and the pressure of the wind on one or the other side of the vane 41 moves the vane around the tower constantly to the leeward causing the house 16 to rotate and turning the turn-pipe 18 in the tower sleeve 17, with the house 16.

A flexible pull element 50 is connected to the vane arm 38, as shown in Figure 2, and is substantially the same as that shown and described in my pending application Serial Number 107,705. This flexible pull element 50 passes over suitable pulleys, such as the pulleys 51 and 52, and then passes down through the hollow turn-pipe 18, the free end of the pull element being fastened or anchored in any suitable or desired manner. The vane arm 38 is shown in its folded position or the pulled-out position in Figures 3, 4, 8 and 9, the house 16 being manually pulled around to the position by the pull element 50 against the pulling tension of the spring 44 to abut the second stop 53 carried by the house 16, the stop 53 engaging one side of the vane arm 38, as shown in Figure 4. The house 16 may be secured in this relative position with the vane arm by attaching the free end of the pull element 50, as stated above, to a suitable anchorage. When the parts are moved to the position where the vane arm 38 contacts the stop 53 carried by the house 16, the wind rotor blade is then in its inoperative position which is edgewise toward the wind. As is shown in Figures 3 and 8, the house 16 is offset on the turn-pipe 18 so that the wind pressure on the front face of the wind rotor blade will tend to push the rotor blade around toward the leeward out of the position where it would be facing the wind squarely, thereby automatically controlling the revolutions of the wind rotor blade 29 during high winds or storm winds. In other words, the tension of the spring 44 on the house hitch 45 tends to hold the house 16 with the rotor blade facing squarely with the wind, as shown in the normal operating position—note Figure 1 and also Figures 2, 6 and 7. The pressure of the wind on the face of the rotor blade 29 opposes the spring pressure on the house 16 and during normal winds, the opposing pressures are close to even or tend to equalize each other, which is the normal operating pressure relation of the speed controlling forces employed in my invention. The wind rotor blade therefore revolves at about the highest desirable speed. When the wind blows at a higher velocity, the wind pressure on the face of the rotor blade and front side 26 of the house 16 becomes greater than the normal opposite pulling pressure of the spring 44. The house is then rotated a short distance around on the tower carrying the stop 53 backwardly in the direction of the vane arm 38, the rotor blade 29 then revolving at a slight angle to the direction of the wind at little or practically no increase of speed. It will, therefore, be noted that the higher the wind and wind pressure on the rotor blade side of the house, the closer the house and vane arm 38 are folded together. The rotor blade will revolve more and more edgewise toward the wind and with no further increase in speed. In other words, the higher the wind the more the wind rotor blade is pushed out of its position facing the wind and this naturally would limit the speed at which the rotor blade is driven in high winds and in storm winds.

By referring particularly to Figures 6, 7, 8 and 9, it will be noted that I have illustrated a modified form of my invention, in which the house 55 is illustrated which is slightly higher than the house 16 in order to accommodate a different arrangement of parts mounted therein. An electric generator 56 is carried within the house 55, as shown, and above the generator 56 is mounted the rotor blade supporting shaft 24ª similar to the shaft 24 previously described, which is also similarly mounted, the shaft 24ª carrying a belt drive wheel 30ª similar to the belt drive wheel 30 previously described in the other form. A belt 33ª similar to the belt 33 is also employed for driving the wheel 30ª from the generator 56. The house 55 is also offset with respect to the turn-pipe 18ª previously described. The pipe 18ª extends upwardly through the bottom of the house to the top thereof, and is secured thereto. This construction adds rigidity to the tall house 55, and further rigidity is added to the house construction at the bottom by welding the base bars 57 to the sides of the turn-pipe 18ª, as indicated in Figure 9. The generator 56 is attached to a suspension consisting of a pair of arms 58 pivotally attached to the side of the house, and a spring 59 indicated in Figures 6 and 7 is anchored to the top of the house and engages one arm 58 to yieldably support a portion of the weight of the generator, part of the weight of the generator being reserved to keep the generator belt 32ª tight to prevent slipping. As shown and as previously indicated, the house 55 is set slightly forwardly over its center on the turn-pipe 18ª to add weight on the rotor blade side to balance some of the weight of the vane and vane-carrying arm 38. When the wind rotor blade 29ª, which is similar to the blade 29, is facing in the normal operating position, the forward offset position of the house aids somewhat in the folding movement of the house back against the vane arm 38ª in storm winds. Also a better balance is obtained by this forward set-over of the house, as this will aid the vane 38ª in holding the house and wind rotor blade facing true with light winds. It will be noted in Figure 2 that a passageway 16ª, and in Figure 7 that a passageway 55ª, are provided around the belt wheel end of the rotor blade shaft in each instance, through which passageways the endless generator drive belts may be passed onto the drive wheels, thereby facilitating the placing or removal of the belt. The type of structure shown in Figures 6 to 9 inclusive, is substantially that as described with respect to Figures 1 to 4 inclusive, with a slight change of design or proportion of parts to accommodate the mechanism placed within the house 55. A suitable flexible pull element 50ª is utilized in conjunction with the vane arm 38ª similar to the flexible pull element 50 described with respect to Figure 1.

What I claim is:

1. A wind power machine comprising a power house with supporting walls forming a compartment, a tower for supporting said compartment for rotating movement, a wind rotor blade, a blade supporting shaft projecting laterally of said compartment, a belt drive wheel carried by said shaft and disposed within said compartment, a shaft bearing support, disposed between said blade and belt drive wheel, said compartment having a passageway around the belt wheel end of said shaft through which an endless belt may be passed onto said wheel, an electric generator disposed within said compartment, a belt for driving said generator from said wheel, and a wind vane attached to said compartment for directing said wind rotor blade toward the wind.

2. A wind power machine comprising a power house with supporting walls forming a compartment, a tower for supporting said compartment for rotating movement, a wind rotor blade, a blade supporting shaft projecting laterally of said compartment, a belt drive wheel carried by said shaft and disposed within said compartment, a shaft bearing support disposed between said blade and belt drive wheel, said compartment having a passageway around the belt wheel end of said shaft through which an endless belt may be passed onto said wheel, an electric generator disposed within said compartment, a belt for driving said generator from said wheel, a wind vane attached to said compartment for directing said wind rotor blade toward the wind, and one wall of said compartment having an opening with a hinged closure adapted to be opened to remove or to replace said belt or generator.

HERBERT G. IRWIN.